(12) United States Patent
Eschner

(10) Patent No.: US 12,546,319 B2
(45) Date of Patent: Feb. 10, 2026

(54) CAN, AND A METHOD FOR PRODUCING SAME

(71) Applicant: Klaus Union GmbH & Co. KG, Bochum (DE)

(72) Inventor: Thomas Eschner, Bochum (DE)

(73) Assignee: Klaus Union GmbH & Co. KG, Bochum (DE)

( * ) Notice: Subject to any disclaimer, the term of this patent is extended or adjusted under 35 U.S.C. 154(b) by 101 days.

(21) Appl. No.: 17/365,821

(22) Filed: Jul. 1, 2021

(65) Prior Publication Data

US 2021/0404472 A1 Dec. 30, 2021

Related U.S. Application Data

(63) Continuation of application No. 15/101,829, filed as application No. PCT/EP2014/076217 on Dec. 2, 2014, now abandoned.

(30) Foreign Application Priority Data

Dec. 5, 2013 (DE) .......................... 102013018159.3

(51) Int. Cl.
| | |
|---|---|
| *F04D 13/02* | (2006.01) |
| *B21D 22/22* | (2006.01) |
| *B65D 1/12* | (2006.01) |
| *F04D 13/06* | (2006.01) |
| *H02K 5/128* | (2006.01) |
| *H02K 15/00* | (2025.01) |
| *H02K 15/14* | (2025.01) |

(52) U.S. Cl.
CPC ........... *F04D 13/025* (2013.01); *B21D 22/22* (2013.01); *B65D 1/12* (2013.01); *F04D 13/0626* (2013.01); *H02K 5/128* (2013.01); *H02K 15/00* (2013.01); *H02K 15/14* (2013.01); *F05D 2230/24* (2013.01)

(58) Field of Classification Search
CPC ............... F04D 13/025; F04D 13/0626; F04D 2230/24; B21D 22/22; B65D 1/12; H02K 5/128; H02K 15/00; H02K 15/114; H02K 2205/1287
USPC ........................................................ 220/610
See application file for complete search history.

(56) References Cited

U.S. PATENT DOCUMENTS

| | | | | |
|---|---|---|---|---|
| 4,952,429 | A | * | 8/1990 | Schmitz .............. F04D 13/0626 428/34.1 |
| 6,039,827 | A | * | 3/2000 | Cramer ................. F04D 13/025 156/169 |

(Continued)

*Primary Examiner* — Orlando E Aviles
*Assistant Examiner* — Niki M Eloshway
(74) *Attorney, Agent, or Firm* — Adams & Reese LLP; John Henry Scott, III

(57) ABSTRACT

A method for producing a can formed from a can part and a flange part is provided, the flange part being formed as an annular body and, on a side oriented inward toward an axis of symmetry of the annular body, an interface forming a bearing for the can part. A base and a lateral wall are formed on the can part, and the can part is deep drawn and made into a target geometry with a defined wall thickness by virtue of the lateral wall being flow formed. The lateral wall has a formed interface with a material thickness greater than the wall thickness of the lateral wall, and the flange part is connected to the can part at the interface.

20 Claims, 4 Drawing Sheets

(56) References Cited

U.S. PATENT DOCUMENTS

Figure 1:
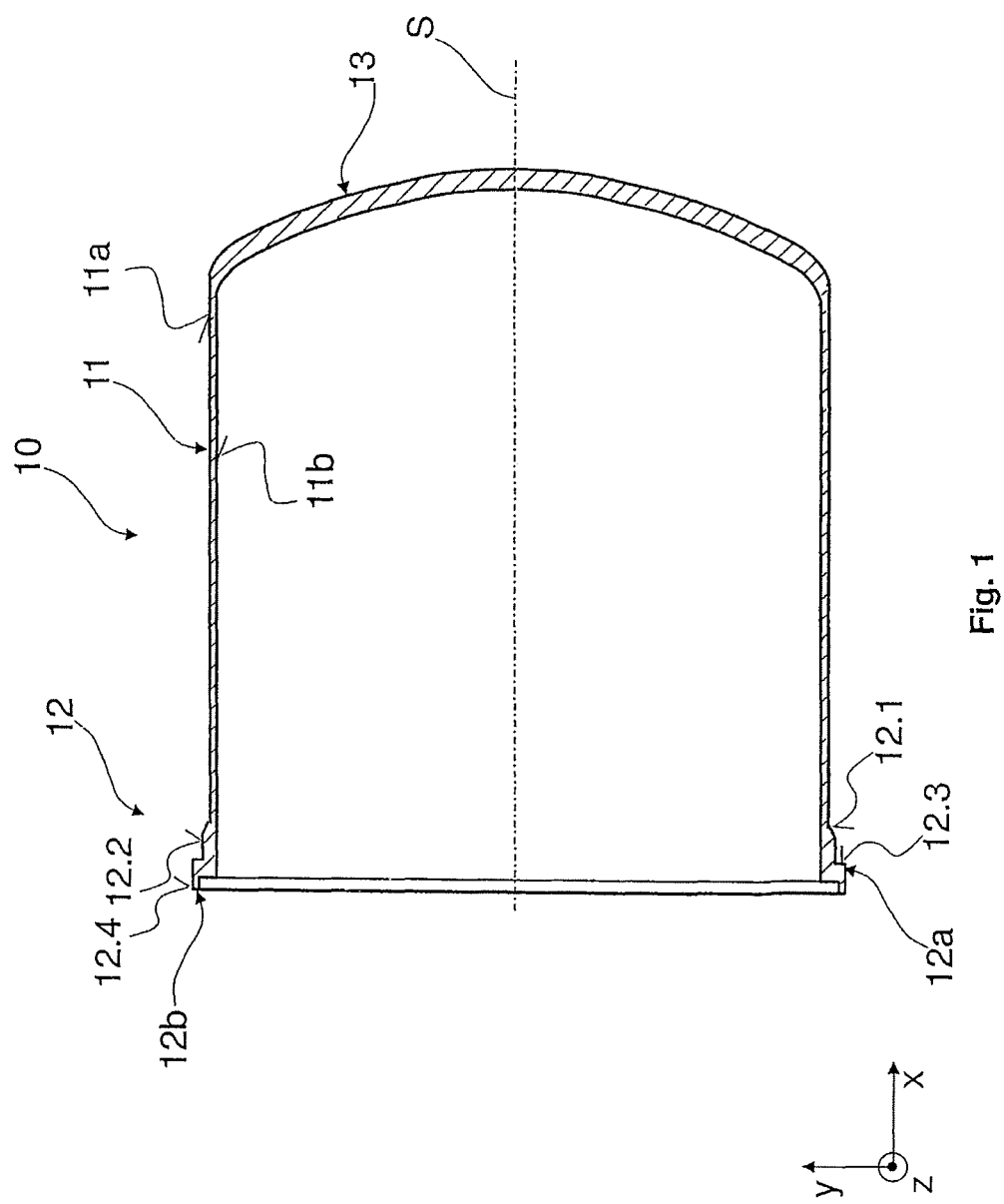

| | | | | |
|---|---|---|---|---|
| 6,124,775 | A * | 9/2000 | Linkner, Jr. | B60T 8/363 335/278 |
| 6,177,741 | B1 * | 1/2001 | Lutkenhaus | F04D 13/064 310/91 |
| 2002/0047304 | A1 * | 4/2002 | Bolitho | B60T 8/363 303/119.2 |
| 2005/0142003 | A1 * | 6/2005 | Hembree | F04D 13/025 417/365 |
| 2009/0252607 | A1 * | 10/2009 | Hein | F04D 29/043 29/888.025 |
| 2010/0313553 | A1 * | 12/2010 | Cavanagh | F01N 3/2066 239/590.5 |
| 2011/0234035 | A1 * | 9/2011 | Wittschier | H02K 49/106 310/104 |
| 2011/0293450 | A1 * | 12/2011 | Grimes | F04B 17/03 417/420 |
| 2014/0001004 | A1 * | 1/2014 | Schneider | H02K 49/106 192/84.1 |
| 2014/0234142 | A1 * | 8/2014 | Mischiatti | F04D 13/0626 417/420 |
| 2014/0271280 | A1 * | 9/2014 | Ley | F04D 13/024 310/43 |
| 2015/0337844 | A1 * | 11/2015 | Eschner | F04D 13/025 148/676 |

\* cited by examiner

CAN, AND A METHOD FOR PRODUCING SAME

The invention relates to a method for producing a can according to the preamble of patent claim 1, and to a corresponding can.

For the delivery of fluids, in particular in the chemical industry, the sealing of delivery lines and pumps usually has to meet stringent requirements. At the same time, it is necessary to ensure good efficiency of the pumps. Magnetically coupled pumps may be statically sealed by a fixed can being arranged between a driver on the drive side and a magnetically driven rotor on the output side and enclosing the rotor. The can is arranged in the magnetic field between the driver and rotor, and the magnetic forces are transmitted through the can. A pump impeller may be coupled to the rotor. The driver and rotor are provided with permanent magnets and are arranged as close to one another as possible in order to be able to provide efficient drive operation. The wall thickness of the lateral wall of the can and tolerances during the process of producing said can predetermine the minimum size necessary for the distance or gap between the driver and rotor.

It is often the case that the distance, and thus the width of the air gap formed between the driver and rotor, is, for example, only approximately 4 mm, and the can then has a wall thickness of, for example, 2 mm. A narrow gap or a very narrow design of the wall thickness of the can to provide for a minimal width of the gap has advantages in respect of efficiency, in particular in terms of minimizing drive losses, but at the same time reduces the reliability, and possibly also the length of service life, of the can, depending on the fluids to be delivered. In order nevertheless to be able to realize the narrowest gap possible, it is important to produce the can with a high level of dimensional accuracy and to configure the geometry of the lateral wall of said can in a manner corresponding precisely to the orientation of the gap. At the same time, it has to be possible for the can to be installed in the pump such that its lateral wall is arranged in as precise a position as possible.

Laid-open application DE 10 2008 026 992 A1 discloses a single-piece, flange-containing can which is intended for a wet-rotor pump and can be produced by deep drawing in combination with flow forming of a lateral wall, a wall thickness of the lateral wall being established in the process, wherein the lateral wall merges into the flange and the can is free of weld seams and the lateral wall has a comparatively small wall thickness with a narrow tolerance range, that is to say it has a high level of dimensional accuracy, and wherein the wall thickness of the lateral wall is smaller than a wall thickness of the other portions of the can.

It is an object of the invention to provide a method for producing a can which gives the can a high level of dimensional accuracy. At the same time, it should be possible for the can to be installed easily and/or in a particularly precise manner in the magnetically coupled pump. Not least is it an object of the invention to configure the can such that it can be produced in a straightforward and cost-effective manner.

This object is achieved by a method as claimed in claim 1 and a can as claimed in claim 7. Advantageous developments of the invention form the subject matter of the dependent claims.

In the case of the method according to the invention for producing a can which is formed from a can part and a flange part, a base and a side wall are formed on the can part, wherein the can part is deep drawn and made into a target geometry with a defined wall thickness by virtue of the lateral wall being flow formed. According to the invention, it is proposed that the lateral wall has formed on it an interface with a material thickness which is greater than the wall thickness of the lateral wall, wherein the flange part can be connected to the can part at the interface. It is possible here for the interface to be formed on the can part, at least to some extent, in particular as early as the flow-forming operation. In other words, the method according to the invention provides the can part on which a kind of bearing for the separate flange part is formed such that the flange part can be coupled to the can part at the interface and forces can be transmitted between the can part and flange part, or a pump component on which the flange part is fastened.

The interface corresponds preferably to a thick-material region which is produced by maintaining solid material of increased wall thickness. The interface is preferably in the form of a solid interface in a peripheral region at the open end of the can part. The interface is then preferably geometrically defined in the solid material of the can part by follow-up machining.

Configuring the can part with an interface at which it can be coupled to the flange part in order to form a two-part can gives the advantage that the can part can be produced in the first instance irrespective of the manner in which attachment to the pump takes place. The flange part is produced separately. This provides for a high level of variability and good flexibility in design as well as the possibility, at the same time, of the advantageous and cost-effective use of identical parts.

The flow forming can produce the can part with a comparatively thin lateral wall, e.g. in the region of 1 mm, wherein the wall thickness of the lateral wall may also lie within a narrow tolerance range, in particular with deviations of less than $1/10$.

The thin wall thickness, but also the narrow tolerance range, give the advantage of a high level of drive efficiency in a magnetically coupled pump, because the driver and rotor of the pump can be arranged particularly close to one another. At the same time, it is possible for the production costs to be kept to a low level, since there is no longer any need for follow-up work to be carried out on the can part. Rather, the can part can be produced with such a high level of accuracy, and such a narrow tolerance range, that there is no longer any need for facing or grinding or any other shaping process. All that is required is for the can part to be connected to the flange part.

Flow forming is to be understood here to be preferably a cold-forming method in which a (lateral) wall of the can part is brought to a defined thickness and receives a defined orientation, in particular a cylindrical geometry with a high level of dimensional accuracy, i.e. not much deviation from the cylindrical shape in the radial direction (accuracy better than $1/10$). It is possible here for the flow forming to result in the cylindrical lateral wall being lengthened in the axial direction without there being any change in the diameter of the can part, in particular in the distance between two center lines each running in the axial direction through the lateral wall.

A target geometry is to be understood here to be a geometry which the can part is to assume at the end of production, in particular in the region of the lateral wall and of the base. The target geometry is defined preferably by the respective wall thickness of the lateral wall and of the base, by an external diameter and by tolerance ranges for the respective dimensions.

According to an exemplary embodiment, the interface has formed on it a shoulder, against which the flange part, as a separate machine element, can be brought into abutment in a defined orientation. A separate machine element is to be interpreted here to be a flange part which is independent of the can part, in particular can be produced independently, and is possibly made of a different material, and by means of which it is possible to form an at least two-part can. The shoulder is preferably made by a follow-up operation, e.g. machining, in particular turning. It is possible here for the shoulder to be formed by virtue of a first and a second lateral sub-surface being made, wherein at least one of the lateral sub-surfaces can be used as a centering means. It is also possible for the shoulder to have formed on it an end surface, via which it is possible to transmit compressive forces which act in particular orthogonally on the end surface. Such a shoulder with an end surface can easily form a bearing by means of which forces can be transmitted from the can part to the flange part without this giving rise to material stressing or torsion which adversely affects the target geometry of the lateral wall. The forces can be directly onward in the direction of the axis of symmetry. Detachment of the can part from the flange part can be ruled out, in particular because the end surface can be dimensioned sufficiently for the forces to be transmitted with a sufficient degree of reliability to the flange part.

According to an exemplary embodiment, following the flow forming and the formation of the interface, the flange part is fitted onto the can part from the base of the latter.

According to the invention, the can part is connected to the flange part by a sealing seam. The sealing seam is preferably an encircling sealing seam. The sealing seam does not absorb the forces, transmitted during operation of the pump via the delivery fluid located in the can, which are directed toward the can base. These forces are transmitted from the can part to the flange part via the form-fitting connection of the interface. There is therefore no risk of the sealing seam rupturing as a result of the forces acting on it. The connection established according to the invention is thus particularly reliable. The sealing seam is preferably a sealing weld, which is made by means of plasma welding.

According to a further exemplary embodiment, a sloping surface is formed on the interface at the transition to the lateral wall, and a cylindrical lateral sub-surface is formed thereon adjacent to the sloping surface. This makes it possible to provide a chamfer, which makes it easier for the flange part to be fitted on, and the flange part can be centered in relation to the can part in a straightforward manner.

According to a further exemplary embodiment, following the deep drawing, during the flow forming of the lateral wall the wall thickness is brought to 1 mm with a tolerance of less than 1/10, with the exception of the region of the interface, and the lateral wall is made into a cylindrical geometry. This means that a can part can be produced with a high level of accuracy, and it is possible to ensure a high level of drive efficiency for a pump with such a can part. It is also the case, with this level of accuracy, that there is no longer any need to subject the lateral wall to further follow-up machining.

In the case of the flange part of the can produced according to the invention, fastening means are provided for arranging the can in a pump. Provision is made here for the flange part to be designed in the form of an annular body and to have, on a side which is oriented inward toward an axis of symmetry of the annular body, an interface which forms a bearing for the can part. The fastening means may be, for example, through-bores or internally threaded bores.

The interface of the flange part preferably has a protrusion and is designed to come into abutment, by way of the protrusion, against a corresponding shoulder of the can part. For efficient and reliable absorption of the forces acting during pump operation, the protrusion here should butt against a can-part-shoulder flank which is directed toward the base of the can part.

Figure 2:
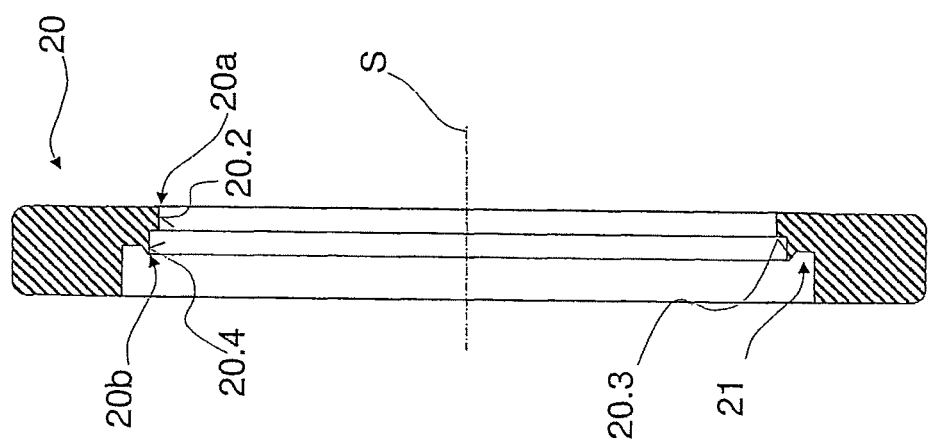
Figure 2:
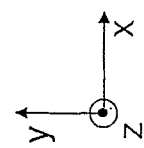
Figure 3:
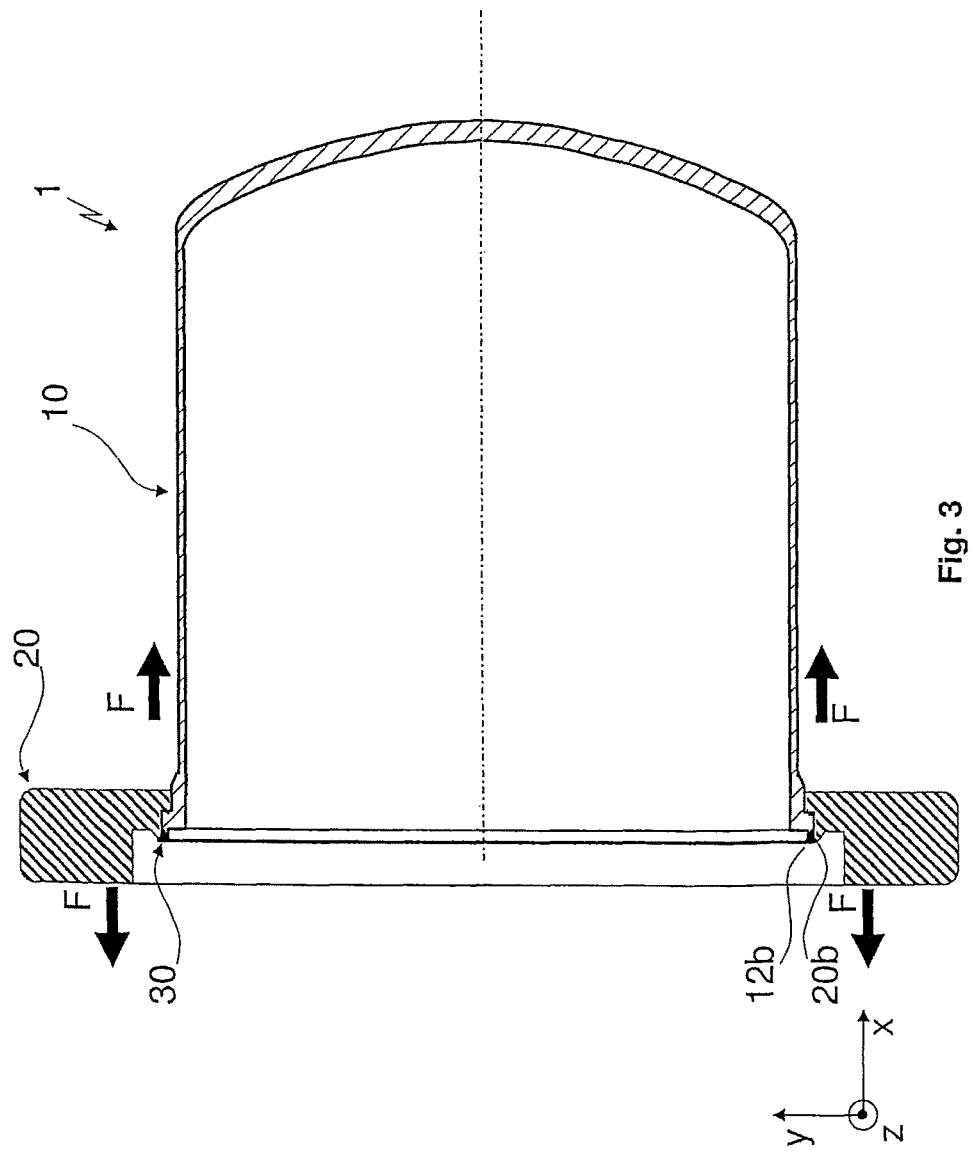
Figure 4:
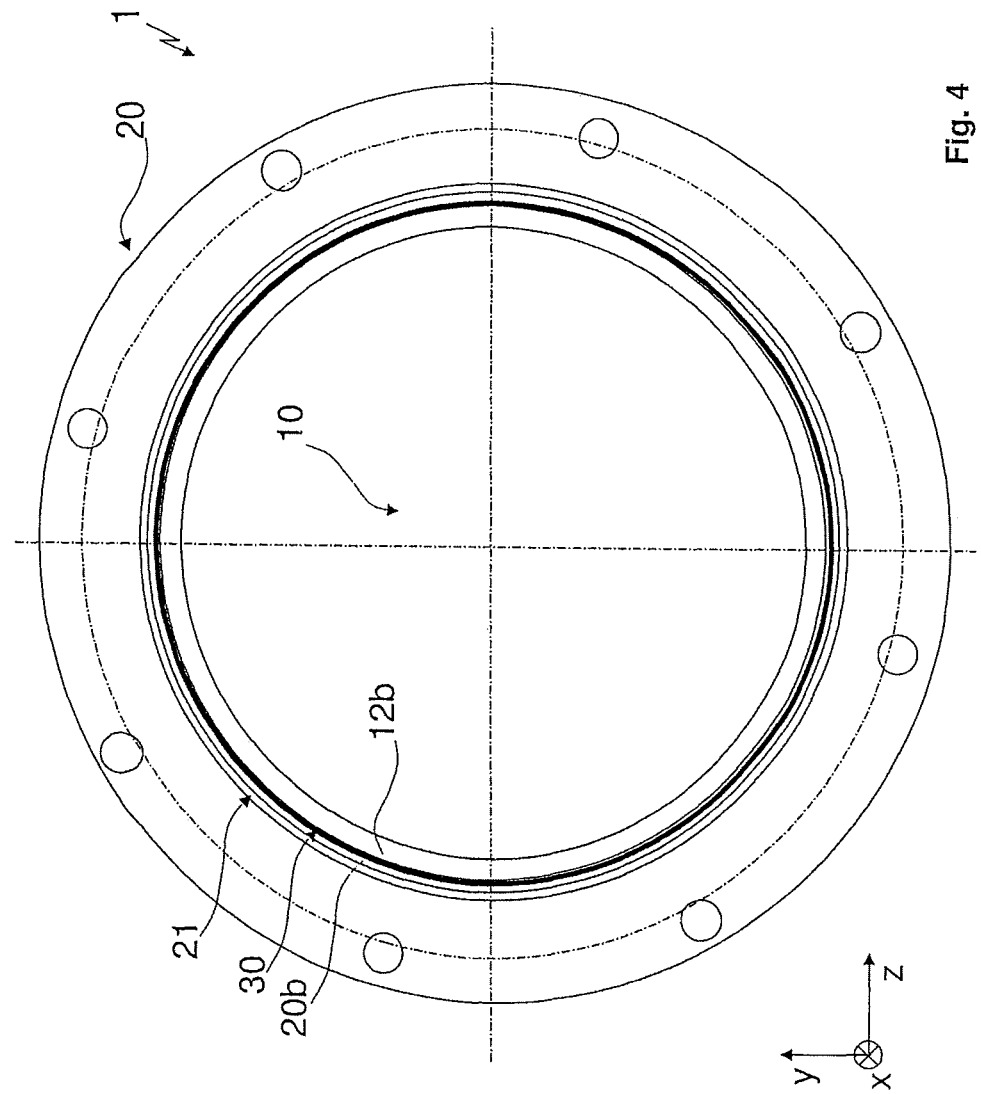

Exemplary embodiments of the invention will be described hereinbelow with reference to the figures, in which:

FIG. 1: shows a sectional view of a can part following deep drawing and flow forming;

FIG. 2: shows a sectional view of a flange part designed to come into abutment against the can part shown in FIG. 1;

FIG. 3: shows a sectional view of a can which is formed from the can part shown in FIG. 1 and a flange part shown in FIG. 2, wherein the can part and the flange part are connected integrally to one another; and FIG. 4: shows a plan view of the can shown in FIG. 3, as seen from the flange-part side.

FIG. 1 shows a deep-drawn can part 10 with an axis of symmetry S, the can part having a lateral wall 11 and a base 13 as well as a peripheral region 12. The lateral wall 11 has an outer lateral surface 11a, which runs preferably strictly parallel to an inner lateral surface 11b, the lateral wall having a cylindrical geometry. The lateral wall 11 has a wall thickness which is smaller than the wall thickness of the base 13, in particular a wall thickness of 1 mm in comparison with the wall thickness of 3 mm of the base. The lateral wall 11 is flow formed, i.e. it is made into a target geometry, with the smallest possible tolerances, by flow forming.

The peripheral region 12 is provided at the open end of the can part 10. The peripheral region 12 has a wall thickness or material thickness which is greater than the wall thickness of the lateral wall 11. A shoulder 12a is provided in the peripheral region, said shoulder being designed to transmit tensile forces between the lateral wall 11 and a flange part (not illustrated). The peripheral region 12 has a plurality of surfaces, which are introduced into the peripheral region 12, for example, by follow-up machining processes such as turning or milling. The lateral wall 11 merges into a sloping surface 12.1, which is designed in the form of a chamfer between the lateral wall 11 and a first lateral sub-surface 12.2. An end surface 12.3 is formed between the first lateral sub-surface 12.2 and a second lateral sub-surface 12.4, it being possible for a force component which acts parallel to the axis of symmetry S to be transmitted at said end surface. At the open end of the can part 10, a crosspiece 12b is formed in the peripheral region 12, it being possible for the can part 10 to be connected to the flange part (not illustrated) via said crosspiece. The crosspiece 12b may be formed, for example, by a shoulder being introduced into the peripheral region 12 by turning or milling. The peripheral region 12 is formed in the manner of an annular reinforcement which stabilizes the open end of the can part 10 and forms an interface to the flange part.

FIG. 2 shows a flange part 20, which has a radial protrusion 20a which forms an undercut for absorbing tensile forces. The protrusion 20a is formed by a first lateral sub-surface 20.2 and an end surface 20.3, which is adjacent to a second lateral sub-surface 20.4. These three surfaces provide a geometry which can be coupled to a corresponding geometry of the can part shown in FIG. 1. Also formed on the flange part 20 is a recess 21, which gives rise to the formation of an extension 20b between the recess 21 and the second lateral sub-surface 20.4. The extension 20b, together with a crosspiece of the can part, forms a region in which a sealing seam may be provided, as will be described in conjunction with FIG. 3.

FIG. 3 shows a can 1 which is formed from the can part 10 shown in FIG. 1 and the flange part 20 shown in FIG. 2, these two parts coming into abutment against one another with sealing action. The flange part 20 is centered on the can part 10, in particular via the first and/or second lateral sub-surfaces of the can part and of the flange part. Forces which act on the can part 10 in accordance with the force arrows F indicated can be transmitted to the flange part 20 via the protrusion. The flange part 20 is connected to the can part 10 via a sealing seam 30, wherein the sealing seam 30 is formed on the crosspiece 12b of the can part 10 and the extension 20b of the flange part. The crosspiece 12b and the extension 20b together form a kind of ring which projects in the direction of the axis of symmetry and on which the two parts can be integrally connected to one another, preferably by welding, in particular plasma welding. The projecting ring makes it possible to avoid the situation where the action of heat during welding results in warping or tilting of the two parts, and the stressing generated in the parts on account of thermal expansion can be minimized. The sealing seam only has to perform a sealing function here. It is possible to ensure the stability of the can by the arrangement defined in the radial direction via the lateral sub-surfaces and by the flow of forces conducted via the protrusion.

FIG. 4 shows the can 1 as seen from the side of the flange part 20, wherein the sealing seam 30 is configured in the form of an encircling sealing weld on the crosspiece 12b and the extension 20b. The recess 21 is located in the radially outward direction in relation to the sealing weld 30, and a shoulder which forms the crosspiece 12b is located in the radially inward direction in relation to the sealing weld 30. The extension 20b and the crosspiece 12b project in a groove-like manner and are therefore easily accessible by way of a tool, in particular a plasma-welding tool.

LIST OF REFERENCE SIGNS

1 Can
10 Can part
Lateral wall
11a Outer lateral surface
11b Inner lateral surface
12 Interface
12a Shoulder
12b Crosspiece
12.1 Sloping surface
12.2 First lateral sub-surface
12.3 End surface
12.4 Second lateral sub-surface
13 Base
20 Flange part
20a Protrusion/undercut
20b Extension
20.2 First lateral sub-surface
20.3 End surface
20.4 Second lateral sub-surface
21 Recess
30 Sealing weld
F Force (direction)
S Axis of symmetry

The invention claimed is:

1. A method for producing a can which is formed from a can part and a flange part, wherein the flange part is formed as an annular body and has, on a side oriented inward toward an axis of symmetry of the annular body, a first interface which forms a bearing for the can part; wherein a base and a lateral wall are formed on the can part, and wherein the can part is deep drawn and made into a target geometry with a defined wall thickness by virtue of the lateral wall being flow formed, wherein the lateral wall has formed on it a second interface with a material thickness which is greater than the wall thickness of the lateral wall, wherein the second interface includes a first lateral sub-surface, a second lateral sub-surface, and a can end surface that extends radially outward from the first lateral sub-surface to the second lateral sub-surface, wherein the flange part is configured to connect to the can part at the second interface, wherein the can part is connected to the flange part by a sealing seam that is formed as a sealing weld, and wherein a force acting on the can part in the direction of the base of the can part is transmitted from the can part to the flange part not via the sealing seam, but via a form-fitting connection formed by the second interface.

2. The method as claimed in claim 1, wherein the second interface has formed on it a shoulder, against which the flange part, as a separate machine element, can be brought into abutment in a defined orientation.

3. The method as claimed in claim 2, wherein a force which acts on the can part can be transmitted to the flange part via the shoulder.

4. The method as claimed in claim 1, wherein, following the flow forming and the formation of the second interface, the flange part is fitted onto the can part, from the side of the base of the can part.

5. The method as claimed in claim 1, wherein a sloping surface is formed on the second interface at a transition to the lateral wall, and the first lateral sub-surface is formed thereon adjacent to the sloping surface.

6. The method as claimed in claim 1, wherein, following the deep-drawing operation, during the flow forming of the lateral wall the wall thickness is brought to 1 mm at the tolerance of less than $\frac{1}{10}$ and the lateral wall is made into a cylindrical geometry.

7. A can having a can part and a flange part, wherein the flange part is formed as an annular body and has, on a side oriented inward toward an axis of symmetry of the annular body, a first interface which forms a bearing for the can part; and wherein the can part has a base and a lateral wall, wherein the can part is a deep-drawn part of which the lateral wall is flow formed and has a defined wall thickness, wherein the can part has a second interface with a material thickness which is greater than the wall thickness of the lateral wall, wherein the second interface includes a first lateral sub-surface, a second lateral sub-surface, and a can end surface that extends radially outward from the first lateral sub-surface to the second lateral sub-surface, wherein the second interface forms a bearing for the flange part, wherein the can part and the flange part are connected to one another via a sealing seam, and wherein a force acting on the can part in the direction of the base of the can part can be transmitted from the can part to the flange part not via the sealing seam, but via a form-fitting connection formed by the second interface.

8. The can of claim 7, wherein the wall thickness of the lateral wall is less than a thickness of the base.

9. The can of claim 7, wherein the second interface includes a crosspiece that forms a region with an extension of the flange part to provide a sealing seam.

10. The can of claim 7, wherein the crosspiece is to form a ring with the extension of the flange part that projects away from the base.

11. A can comprising:
a flange part with a flange end surface; and
a can part with a base, a lateral wall, and a peripheral region at an open end of the can part that opposes the base, the lateral wall coupled between the base and the peripheral region, the lateral wall having a wall thickness that is less than a material thickness of the peripheral region, the peripheral region including a first lateral sub-surface, a second lateral sub-surface, and a can end surface that extends radially outward from the first lateral sub-surface to the second lateral sub-surface, and the can end surface configured to abut the flange end surface of the flange part to form the can.

12. The can of claim 11, wherein the peripheral region includes a crosspiece that forms a region with an extension of the flange part to provide a sealing seam.

13. The can of claim 12, wherein the crosspiece is to project in a groove-like manner with the extension of the flange part.

14. The can of claim 12, wherein the crosspiece is to form a ring with the extension of the flange part that projects away from the base.

15. The can of claim 12, wherein a force acting on the can part in a direction of the base transmits from the can part to the flange part via the peripheral region, not via the sealing seam.

16. The can of claim 12, wherein the crosspiece is formed as a shoulder introduced into the peripheral region by turning or milling an inner lateral surface of the peripheral region.

17. The can of claim 11, wherein the peripheral region includes a sloping surface that is formed as a chamfer between the lateral wall and the first lateral sub-surface.

18. The can of claim 11, wherein the peripheral region provides annular reinforcement to stabilize the open end of the can part.

19. The can of claim 11, wherein the peripheral region includes a sloping surface that is formed as a chamfer between the lateral wall and the first lateral sub-surface.

20. The can of claim 11, wherein the first and second sub-surfaces are to center the flange part relative to the can part.

* * * * *